(12) United States Patent
Tsai et al.

(10) Patent No.: US 11,714,946 B2
(45) Date of Patent: *Aug. 1, 2023

(54) STANDARD CELL AND SEMICONDUCTOR DEVICE INCLUDING ANCHOR NODES AND METHOD OF MAKING

(71) Applicant: TAIWAN SEMICONDUCTOR MANUFACTURING COMPANY, LTD., Hsinchu (TW)

(72) Inventors: Nien-Yu Tsai, Hsinchu (TW); Chin-Chang Hsu, Hsinchu (TW); Wen-Ju Yang, Hsinchu (TW); Hsien-Hsin Sean Lee, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/395,193

(22) Filed: Aug. 5, 2021

(65) Prior Publication Data

US 2021/0365623 A1 Nov. 25, 2021

Related U.S. Application Data

(60) Division of application No. 16/902,846, filed on Jun. 16, 2020, now Pat. No. 11,106,852, which is a
(Continued)

(51) Int. Cl.
*G06F 30/30* (2020.01)
*H01L 27/02* (2006.01)
(Continued)

(52) U.S. Cl.
CPC .......... *G06F 30/392* (2020.01); *G06F 30/398* (2020.01); *H01L 27/0203* (2013.01);
(Continued)

(58) Field of Classification Search
None
See application file for complete search history.

(56) References Cited

U.S. PATENT DOCUMENTS 7,093,228 B2   8/2006   Abdreev et al.
7,687,207 B2   3/2010   Graur et al.
(Continued)

FOREIGN PATENT DOCUMENTS

CN   102542099   12/2013
TW   201027381   7/2010
TW   I507907   11/2015

*Primary Examiner* — Leigh M Garbowski
(74) *Attorney, Agent, or Firm* — Hauptman Ham, LLP

(57) ABSTRACT

A semiconductor device includes a first cell. The first cell includes a first functional feature, a first sensitivity region, at least one anchor node, wherein each of the at least one anchor node is different from the first functional feature, and a number of anchor nodes of the at least one anchor node linked to the first functional feature is based on a position of the first functional feature relative to the first sensitivity region. The semiconductor device further includes a second cell abutting the first cell. The second cell includes a second functional feature, wherein the second functional feature satisfies a minimum spacing requirement with respect to the first functional feature.

20 Claims, 9 Drawing Sheets

Related U.S. Application Data continuation of application No. 16/231,840, filed on Dec. 24, 2018, now Pat. No. 10,713,407, which is a division of application No. 14/956,668, filed on Dec. 2, 2015, now Pat. No. 10,162,928.

(51) Int. Cl.

| | | |
|---|---|---|
| *G06F 30/392* | (2020.01) | |
| *G06F 30/398* | (2020.01) | |
| G06F 119/18 | (2020.01) | |
| G06F 30/39 | (2020.01) | |

(52) U.S. Cl.
CPC .......... *H01L 27/0207* (2013.01); *G06F 30/39* (2020.01); *G06F 2119/18* (2020.01)

(56) References Cited

U.S. PATENT DOCUMENTS

| | | |
|---|---|---|
| 8,132,130 B2 | 3/2012 | Chen et al. |
| 8,421,205 B2 | 4/2013 | Yang |
| 8,448,100 B1 | 5/2013 | Lin et al. |
| 8,516,403 B2 | 8/2013 | Abou Ghaida et al. |
| 8,661,389 B2 | 2/2014 | Chern et al. |
| 8,698,205 B2 | 4/2014 | Tzeng et al. |
| 8,751,974 B2 | 6/2014 | Kahng |
| 8,826,212 B2 | 9/2014 | Yeh et al. |
| 8,836,141 B2 | 9/2014 | Chi et al. |
| 9,122,838 B2 | 9/2015 | Lin et al. |
| 9,176,373 B2 | 11/2015 | Cheng et al. |
| 9,262,570 B2 | 2/2016 | Hsu et al. |
| 9,514,266 B2 | 12/2016 | Tsai |
| 9,766,539 B2 | 9/2017 | Nakayama et al. |
| 9,842,185 B2 | 12/2017 | Riviere-Cazaux |
| 10,162,928 B2 * | 12/2018 | Tsai ................ G06F 30/398 |
| 11,106,852 B2 * | 8/2021 | Tsai ................ H01L 27/0207 |
| 2014/0215420 A1 | 7/2014 | Lin et al. |
| 2014/0244215 A1 | 8/2014 | Nakayama et al. |
| 2014/0264924 A1 | 9/2014 | Yu et al. |
| 2014/0282289 A1 | 9/2014 | Hsu et al. |
| 2014/0325466 A1 | 10/2014 | Ke et al. |
| 2015/0040083 A1 | 2/2015 | Cheng et al. |
| 2015/0089457 A1 | 3/2015 | Agarwal et al. |
| 2015/0095865 A1 | 4/2015 | Bhattacharya et al. |

* cited by examiner

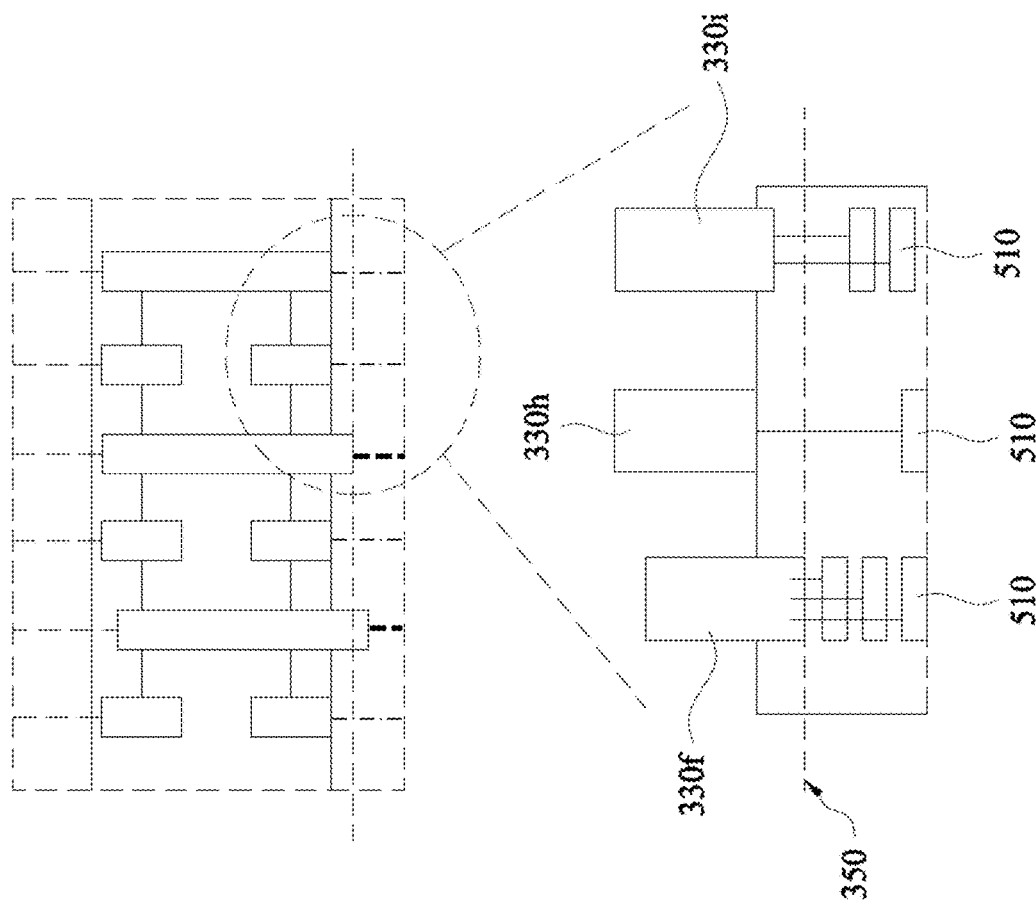

STANDARD CELL AND SEMICONDUCTOR DEVICE INCLUDING ANCHOR NODES AND METHOD OF MAKING

PRIORITY CLAIM

This application is a divisional of U.S. application Ser. No. 16/902,846 filed Jun. 15, 2020, which is a continuation of U.S. application Ser. No. 16/231,840, filed Dec. 4, 2018, which is a divisional of U.S. application Ser. No. 14/956,668, filed Dec. 2, 2015, now U.S. Pat. No. 10,162,928, issued Dec. 25, 2018, which are incorporated herein by reference in their entireties.

BACKGROUND

In semiconductor fabrication processes, when features in a single layer of a semiconductor device are positioned closer than patterning resolution permits, multiple masks are often used in order to pattern the features. The features of the single layer of the semiconductor device are separated into different masks so that each mask includes features which are separated by a distance equal to or greater than a patterning resolution parameter. In some instances, a process using two masks is called double patterning and a process using three masks is call triple patterning.

While designing a semiconductor device, designers will lay out the features of the semiconductor device in a layout pattern. These layout patterns include commonly used structures which are stored as standard cells in a cell library. A cell library is a database of standard cells which a designer can use in order to efficiently insert commonly used structures in a layout pattern while avoiding the extra task of designing each structure for each different semiconductor device.

In some instances, these standard cells are checked to determine whether the standard cell is colorable based on a number of masks used to form the single layer of the semiconductor device. A cell is colorable if the features of the cell are able to be separated into the number of masks with each mask maintaining a separation of the features greater than or equal to the patterning resolution parameter. For example, a standard cell which is compatible with a double patterning process is called 2-colorable, and a standard cell which is compatible with a triple patterning process is called 3-colorable.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a plan view of a standard cell including anchor nodes in accordance with some embodiments.

DETAILED DESCRIPTION

Figure 1:
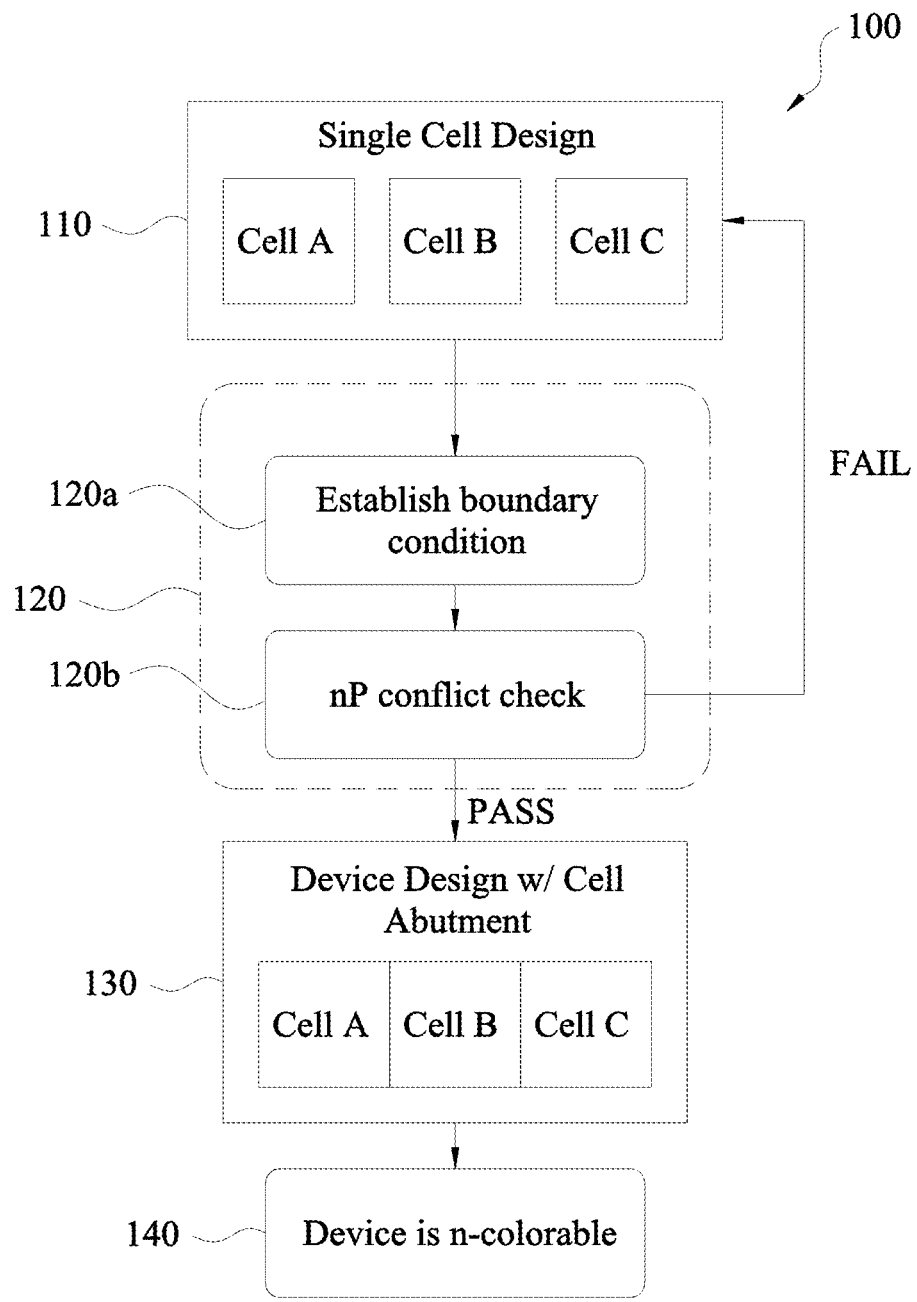
FIG. 1 is a flowchart of a method of designing a semiconductor device in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a flowchart of a method 100 of designing a semiconductor device in accordance with some embodiments. In operation 110, a single cell is designed. This single cell design is analyzed during operation 120 to determine whether the single cell will be n-colorable when included in a semiconductor device, where n is a number of masks used to fabricate a layer of the semiconductor device. Operation 120 includes two-sub operations in method 100. In operation 120a, boundary conditions are established within the single cell. In operation 120b, the single cell with the boundary conditions is analyzed to determine if there is an n-patterning conflict for the features within the single cell. If the single cell with the boundary conditions is determined to be free of conflicts for n-patterning, then method 100 proceeds to operation 130. In operation 130, multiple single cells are used to design the semiconductor device. At least two of these single cells abut one another, so that cell boundaries of each of the singles cells are in contact with each other. Following operation 130, a layout of the semiconductor device is determined to be n-colorable in operation 140 without an additional intervening analysis for n-patterning conflicts. If the single cell with the boundary conditions is determined to include conflicts for n-patterning, then method 100 returns from operation 120 to operation 110 to modify a layout of the single cell.

By avoiding an analysis for n-patterning conflicts after operation 130, method 100 increases an efficiency of designing the semiconductor device. In methods which lack the establishment of boundary conditions introduced in operation 120a of method 100, an additional n-patterning analysis is used after designing the entire layer of the semiconductor device. As a result, a larger and more complex conflict graph is created for the entire layer of the semiconductor device. A conflict graph is a visual representation of features of the semiconductor device which are positioned within a GO spacing distance from other features in the design. The features are depicted as nodes which are connected by links to other features which are within the GO spacing for manufacturing the semiconductor device. Conflict graphs are used to assist with the n-patterning conflict analysis. As a number of features included in a conflict graph increase and as a number of links within the conflict graph increase, analysis and modification of the layout become more complex and time consuming. In some instances, this n-patterning analysis of the entire layer of the semiconductor device will identify conflicts between features near a cell boundary for abutting cells in the semiconductor device layout. By introducing boundary conditions in operation 120a, method 100 is able to skip the extra n-patterning analysis following operation 130, which results in increased efficiency in designing semiconductor devices.

In operation 110, the single cell having a predetermined function is designed and a layout of the single cell is generated. The layout of the single cell is analyzed to determine whether the features of the cell are n-colorable. Colorable refers to the ability of the features of the cell to be assigned to n number of masks used to form the layer in the semiconductor device. Features which are assigned to a same mask are labeled within the layout as having a same color to assist the designer in creating the cell. Features having a same color are separated by at least a minimum spacing requirement, GO, in order to increase precision of the manufacturing process for the semiconductor device.

In some embodiments, multiple cells are designed in operation 110. In some embodiments, each cell designed in operation 110 has a different function. In some embodiments, at least one cell designed in operation 110 has a same function as at least one other cell designed in operation 110, but has a different layout. In some embodiments, the designed cell is stored in a cell library for later use by a designer.

In some embodiments, previously designed cells are imported into method 100 in operation 110. In some embodiments, the previously designed cells are imported from a cell library. In some embodiments, the cell libraries are designed for different manufacturing processes which have different GO spacings between features of a cell.

In operation 120, the cell or cells from operation 110 are analyzed to determine whether the cell or cells will be n-colorable in the semiconductor device. During the design of the cell or cells in operation 110, the cell is subjected to n-patterning analysis in some embodiments. Operation 120 introduces boundary conditions near cell boundaries for the cell in order to avoid an additional n-patterning analysis on an entire layer of the semiconductor device.

In operation 120a, boundary conditions are introduced based on a risk of a feature near a boundary of the cell being located within a GO spacing of features in an abutting cell following design of the layer of the semiconductor device. A sensitivity region is defined within the cell based on GO spacing of a process used to form the layer of the semiconductor device. The sensitivity region is used to define a risk factor for features which contact or overlap the sensitivity region. In some embodiments, the risk factors are determined based on an amount of overlap between the feature and the sensitivity region.

In operation 120b, the n-patterning conflict analysis is performed on the cell which includes the boundary conditions. The n-patterning conflict analysis is used to reduce the risk that the features which overlap the sensitivity region in the cell will be within a GO spacing of features in an abutting cell following formation of the layer of the semiconductor device.

If operation 120b determines that the cell is not n-colorable, method 100 returns to operation 110 and the cell is modified. In some embodiments, the cell is modified based on instructions from the designer. In some embodiments, the cell is modified to change a location of at least one feature in the cell relative to a cell boundary. In some embodiments, the cell is modified to change a location of at least one feature in the cell relative to another feature in the cell.

If operation 120b determines that the cell is n-colorable, method 100 proceeds to operation 130.

In operation 130, the layer of the semiconductor device is designed by connecting different cells together in order to perform a desired function of the semiconductor device. At least one cell of the layer of the semiconductor device abuts another cell of the layer of the semiconductor device. In some embodiments, abutting cells are selected to perform different functions. In some embodiments, abutting cells are selected to perform a same function. In some embodiments, abutting cells have a same layout. In some embodiments, one of the abutting cells has a different layout from another of the abutting cells. In some embodiments, one cell abuts more than one other cell.

In operation 140, a layout of the layer of the semiconductor device is reported as being n-colorable. In some embodiments, the layout of the layer of the semiconductor device is output to a designer. In some embodiments, the layout of the layer of the semiconductor device is used to generate instructions for creating masks for formation of the layer of the semiconductor device.

Figure 2:
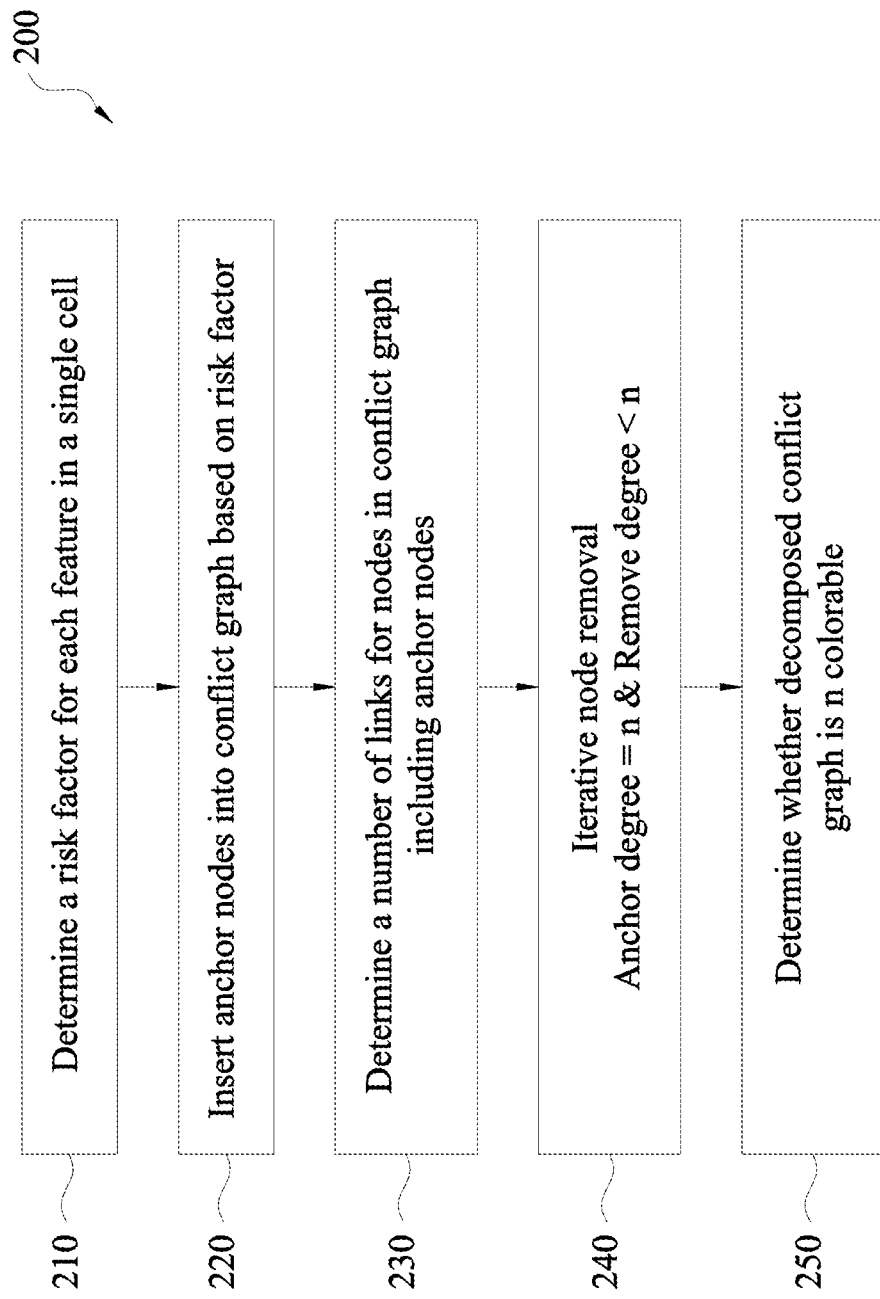
FIG. 2 is a flowchart of a method of determining whether a standard cell is colorable based on risk factors in accordance with some embodiments.

FIG. 2 is a flowchart of a method 200 of determining whether a standard cell is colorable based on risk factors in accordance with some embodiments. In operation 210, a risk factor for each feature in a single cell is determined. The risk factor is a measure of the risk of the feature being within a GO spacing of a feature in an abutting cell following design of a layer of the semiconductor device. In operation 220, anchor nodes are inserted into a conflict graph for the cell based on the risk factor. Anchor nodes are virtual nodes which simulate the potential for a feature of the abutting cell to be within the GO spacing of the feature in the cell being analyzed. A number of links for nodes within the conflict graph, which includes anchor nodes, are determined in operation 230. In operation 240, nodes having a number of links less than n, a number of masks used to manufacture the layer of the semiconductor device, are removed. Operation 240 is performed iteratively until an iteration of operation 240 removes zero nodes. Anchor nodes are defined to have a number of links equal to n to prevent removal of anchor nodes during operation 240. Operation 240 produces a decomposed conflict graph. The conflict graph is called decomposed because of the removal of nodes during operation 240. In operation 250, the decomposed conflict graph is analyzed to determine whether the decomposed conflict graph is n-colorable.

In operation 210, the risk factor for each feature in the cell is determined based on a position of the feature with respect to a sensitivity region. In some embodiments, the sensitivity region is equal to one-half of the GO spacing for the process for manufacturing the layer of the semiconductor device. Two abutting cells each having the sensitivity region equal to one-half of the GO spacing results in a combined sensitivity region for the abutting cells equal to the GO spacing. In some embodiments, the sensitivity region is equal to greater than one-half of the GO spacing to reduce the risk of forming a semiconductor device where features are too close together due to manufacturing variations. In some embodiments, the sensitivity region is less than one-half of the GO spacing for cells which do not have a high concentration of features.

The sensitivity region extends around an entirety of the cell adjacent to the cell boundary. In some embodiments, a width of the sensitivity region is constant around the periphery of the cell. In some embodiments, a width of the sensitivity region varies within the cell based on a concentration of features within the cell or a manufacturing process used for forming the layer of the semiconductor device.

The sensitivity region acts as a reference point for determining the risk factors. For example, a feature which does not contact or overlap with the sensitivity region has a risk factor of zero in some embodiments. A feature which contacts an edge of the sensitivity region, but does not overlap the sensitivity region has a risk factor of one in some embodiments. Features which overlap with the sensitivity region have a risk factor ranging from two to n, where n is the number of masks used to form the layer of the semiconductor device.

The risk factor for features which overlap the sensitivity region is determined based on an amount of overlap. In some embodiments, thresholds for determining the risk factor are evenly distributed within the sensitivity region. In some embodiments, thresholds for determining the risk factor are non-uniformly distributed within the sensitivity region. For example, in a triple patterning process, i.e., n=3, the threshold between a risk factor of two and a risk factor of three is a center line of the sensitivity region in some embodiments. In some embodiments, the threshold between the risk factor of two and the risk factor of three is displaced from the center line of the sensitivity region. Factors to be considered for placement of the thresholds for determining the risk factor for each of the overlapping features include the GO spacing, the concentration of features within the cell and an overall size of the semiconductor device. As the GO spacing increases, the threshold for the risk factor moves farther from the cell boundary, in some embodiments. As the concentration of features within the cell increases, the threshold for the risk factors moves farther from the cell boundary, in some embodiments. As the overall size of the semiconductor device increases, the threshold for the risk factors moves closer to the cell boundary, in some embodiments.

In operation 220, anchor nodes are inserted into the conflict graph for the cell based on the risk factors. As discussed above, the conflict graph includes nodes for each of the features in the cell which is positioned within a GO spacing from another feature of the cell as well as links between the features within the GO spacing from each other. The anchor nodes are added to increase a number of links connected to a node of the cell. A number of anchor nodes attached to each node of the conflict graph is equal to the risk factor for that feature. For example, no anchor nodes are added to a node for a feature having a risk factor of zero, while three anchor nodes are added to a node for a feature having a risk factor of three. The anchor nodes are virtual nodes, which do not represent actual features, but a potential for features being located within the GO spacing from the corresponding feature connected to the anchor nodes.

A number of links for each node of the conflict graph is determined for the conflict graph which includes the anchor nodes, in operation 230. Links to anchor nodes are included in the number of links for nodes within the conflict graph. However, a number of links for each anchor node is not determined, in some embodiments.

In operation 240, nodes having a number of links below the number of masks used to form the layer of the semiconductor device are removed from the conflict graph in an iterative manner. In some embodiments, operation 240 is called decomposition of the conflict graph. A detailed description of a decomposition process for a conflict graph is provided in U.S. application Ser. No. 13/955,780 (US Pre-Grant Publication No. 2015/0040083), which is incorporated herein by reference in its entirety.

The iterative nature of operation 240 means that as nodes are removed during a first iteration of operation 240, a number of links for nodes linked to the removed nodes decreases as well. As a result, additional nodes are removable during later iterations of operation 240 as the number of links to the nodes decreases as more nodes are removed.

Operation 240 proceeds until all remaining nodes have a number of links at least equal to the number of masks used to form the layer of the semiconductor layer; or until all nodes are removed from the conflict graph. If operation 240 results in all nodes being removed from the conflict graph, then the cell is determined to be n-colorable. If operation 240 fails to remove all nodes of the conflict graph, method 200 proceeds to operation 250.

In operation 250, the decomposed conflict graph is analyzed to determine whether the decomposed conflict graph is n-colorable. In some embodiments, the analysis is a rule-based analysis. In some embodiments, the analysis is a heuristic-based analysis. In some embodiments, the analysis is performed manually by a designer.

An example of a rule-based analysis includes comparing a number of links attached to a node with a number of loops of which the node is a part. In some embodiments, the rule-based analysis also considers a number of odd loops of which the node is a part. An odd loop is a loop within the conflict graph which includes an odd number of nodes. A specific example of a rule-based analysis is that a node is determined to not be colorable if a number of links is equal to a number of loops, unless the number of odd loops associated with the node is less than or equal to one or the node is a centroid of a wheel graph where the node is surrounded by an odd number of nodes. A detailed description of examples of a rule-based analysis for colorability of a decomposed conflict graph is provided in U.S. Pat. No. 9,122,838, which is incorporated herein by reference in its entirety.

An example of a heuristic-based analysis is comparing an arrangement of features with previously analyzed arrangements of features. In some embodiments, heuristic-based analysis focuses on a node having a most number of links in determining whether the conflict graph is n-colorable.

An example of a manual analysis is a trial and error analysis by the designer. The designer assigns a color to a node and then determines whether colors are able to be assigned to the remaining nodes of the decomposed conflict graph without any adjacent nodes having a same color.

In some embodiments, a GO spacing remains constant for every layer of the semiconductor device. In some embodiments, at least one layer of a semiconductor device includes a different GO spacing from another layer of the semiconductor device. In some embodiments, a number of masks used to form each layer of the semiconductor device is constant for every layer of the semiconductor device. Method 100 and method 200 are usable with different GO spacing for different layers within the semiconductor device by adjusting a width of the sensitivity region of the cell based on changes in the GO spacing.

In some embodiments, at least one layer of the semiconductor device is formed using a different number of masks from at least one other layer of the semiconductor device. Method 100 and method 200 are usable with different numbers of masks used to form layers of the semiconductor device by adjusting a value of n within the methods.

FIGS. 3-7B are used to provide an example for implementation of method 100 or method 200, in some embodiments. FIGS. 3-7B are discussed with respect to triple patterning, i.e., n equals three. However, one of ordinary skill in the art would recognize that the information discussed with respect to FIGS. 3-7B are applicable to higher order patterning processes, e.g., n equal to or greater than four.

Figure 3:
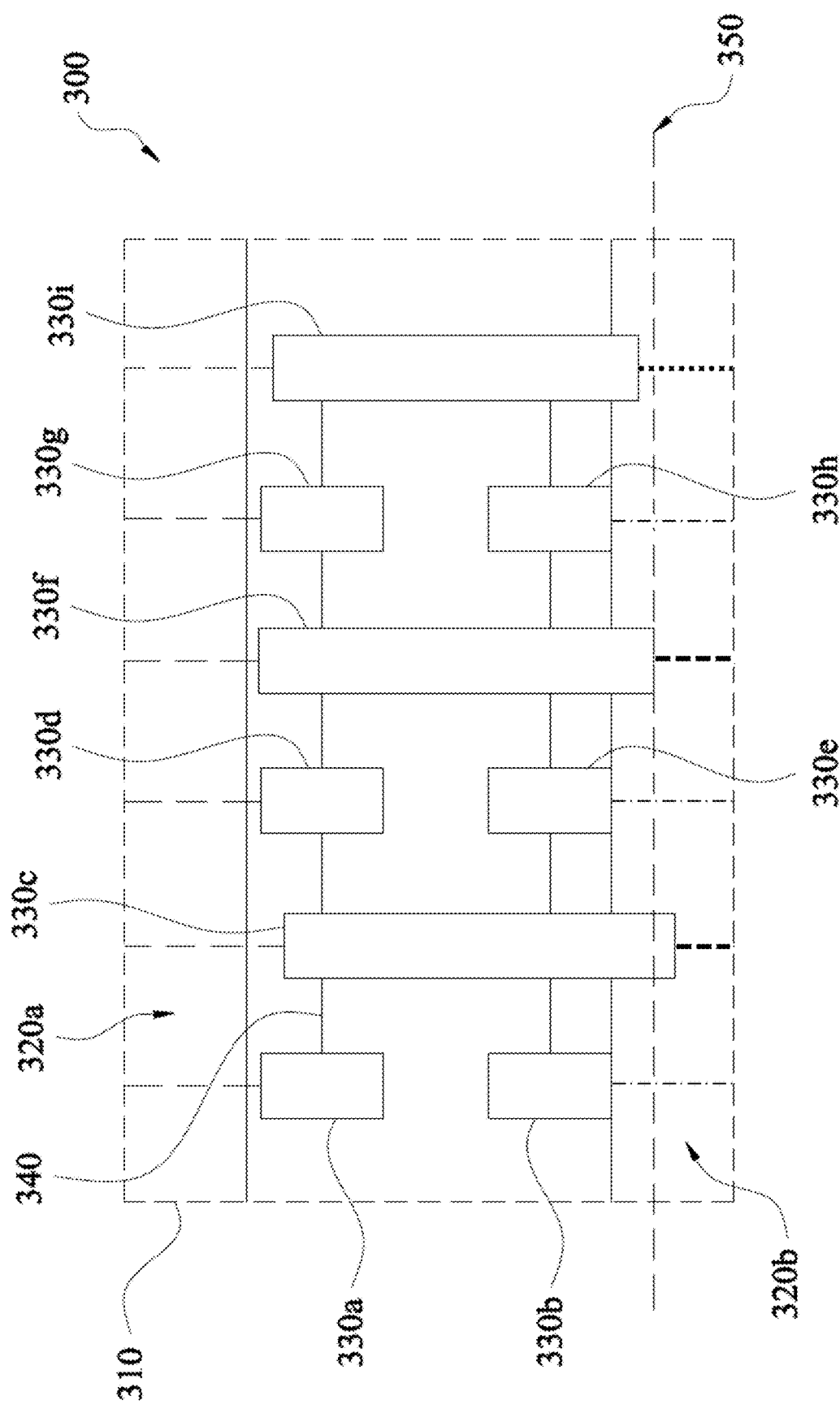
FIG. 3 is a plan view of a standard cell in accordance with some embodiments.

FIG. 3 is a plan view of a standard cell 300 in accordance with some embodiments. In some embodiments, standard cell 300 is stored in a cell library. In some embodiments, standard cell 300 was created by a designer. In some embodiments, standard cell 300 is a modified version of a cell stored in a cell library. Standard cell 300 includes a cell boundary 310 which defines a perimeter of the standard cell. Standard cell 300 also includes two sensitivity regions 320a and 320b. Standard cell 300 depicts only sensitivity regions along horizontal sides of the standard cell. However, one of ordinary skill in the art would recognize that the standard cell includes sensitivity regions along vertical sides of the standard cell, in some embodiments. Features 330a-330i, collectively referred to as features 330, correspond to elements of standard cell 300 used to impart functionality to the standard cell. Links 340 connect features 330 which are located with GO spacing from each other. Sensitivity region 320b includes a threshold line 350 to determine a risk factor for features 330 which overlap with sensitivity region 320b.

Cell boundary 310 defines an outer perimeter of standard cell 300. Cell boundary 310 determines how close to features 330 a feature located in an abutting cell is able to be located.

Sensitivity regions 320a and 320b are located along horizontal sides of standard cell 300 within cell boundary 310. Sensitivity regions 320a and 320b are used to identify a risk of a feature in an abutting cell being within a GO spacing from features 330 within the standard cell 300. In some embodiments, standard cell 300 also includes sensitivity regions along vertical sides inside of cell boundary 310.

In some embodiments, a width of sensitivity region 320a is equal to a width of sensitivity region 320b. In some embodiments, a width of sensitivity region 320a is different from a width of sensitivity region 320b. In some embodiments, at least one of sensitivity region 320a or sensitivity region 320b has a width equal to one-half of the GO spacing. In some embodiments, at least one of sensitivity region 320a or sensitivity region 320b has a width different from one-half of the GO spacing.

Features 330 represent elements within standard cell 300 for implementing a function of the standard cell. Features 330 are depicted a rectangular shapes for simplicity. In some embodiments, features 330 include non-rectangular shapes, e.g., oval shapes, polygonal shapes, curvilinear shapes, free form shapes or other suitable shapes. In some embodiments, features 330 include interconnect structures, contact structures, gate structures, or other suitable structures.

Links 340 connect features 330 which are located within the GO spacing from each other. Features 330 which are connected by a link 340 are not able to be reliably manufactured using a same mask. For example, feature 330a is not able to be manufactured using a same mask as feature 330c as indicated by link 340 connecting these two features.

Risk factors for each of the features 330 are indicated by dashed lines extending from an end of the feature to cell boundary 310. Features 330 which have an end spaced from a sensitivity region 320a or 320b have a risk factor of zero with respect to a corresponding edge of standard cell 300. Because no features 330 contact or overlap sensitivity region 320a, all features 330 have a risk factor of zero with respect to a top edge of standard cell 300.

Threshold line 350 is located in a center of sensitivity region 320b. In some embodiments, threshold line 350 is located closer to cell boundary 310 than the center of sensitivity region 320b. In some embodiments, threshold line 350 is farther from cell boundary 310 than the center of sensitivity region 320b. A location of the threshold line 350 is determined based on the GO spacing, a number of masks used to form the standard cell 300 or an overall size of a semiconductor device including standard cell 300.

A feature which overlaps sensitivity region 320b but does not pass threshold line 350 has a risk factor of two. A feature which overlaps sensitivity region 320b and passes threshold line 350 has a risk factor of three. In some embodiments, a feature which contacts threshold line 350, but does not pass the threshold line has a risk factor of two. In some embodiments, a feature which contacts threshold line 350, but does not pass the threshold line has a risk factor of three.

Feature 330b, feature 330e and feature 330h contact sensitivity region 320b, but do not overlap with sensitivity region 320b. Thus, feature 330b, feature 330e and feature 330h have a risk factor of one with respect to a bottom edge of standard cell 300. Feature 330c overlaps with sensitivity region 320b, therefore, feature 330c has a risk factor of two or three (for triple patterning processes) with respect to the bottom edge of standard cell 300. Feature 330c has a risk factor of three because feature 330c passes threshold line 350. Feature 330f overlaps with sensitivity region 320b and contacts threshold line 350. Feature 330f has a risk factor of three in standard cell 300. In some embodiments, feature 330f has a risk factor of two, as discussed above. Feature 330i overlaps with sensitivity region 320b, but does not pass threshold line 350. Feature 330i has a risk factor of two.

Figure 4A:
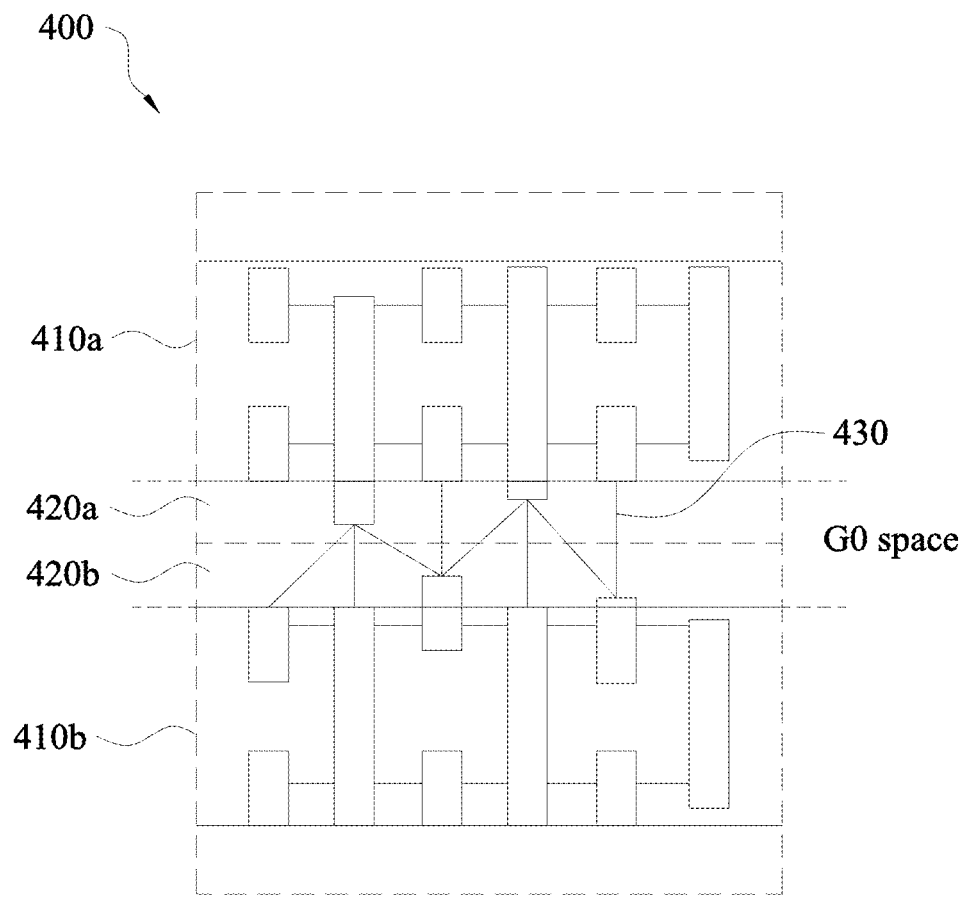
FIG. 4A is a plan view of a semiconductor device including two abutting standard cells in accordance with some embodiments.

FIG. 4A is a plan view of a semiconductor device 400 including two abutting standard cells 410a and 410b, in accordance with some embodiments. Cell 410a includes sensitivity region 420a abutting sensitivity region 420b of cell 410b. Features of cells 410a and 410b overlap sensitivity regions 420a and 420b. Links 430 between features of cell 410a and cell 410b indicate that the location of features near the abutting surface of cell 410a and 410b impact whether the semiconductor device is n-colorable regardless of whether cell 410a or cell 410b is individually n-colorable.

A combined width of sensitivity regions 420a and 420b is equal to the GO spacing. In some embodiments, a width of sensitivity region 420a is equal to a width of sensitivity region 420*b*. In some embodiments, a width of sensitivity region 420*a* is different from a width of sensitivity region 420*b*. The width of sensitivity region 420*a* and the width of sensitivity region 420*b* are determined based on a minimum separation distance defined by manufacturing process used to form the features of cells 410*a* and 410*b*.

Method 100 and method 200 help to ensure that semiconductor device 400 is n-colorable based on analysis of the cell 410*a* and cell 410*b* individually with the inclusion of boundary conditions.

Figure 4B:
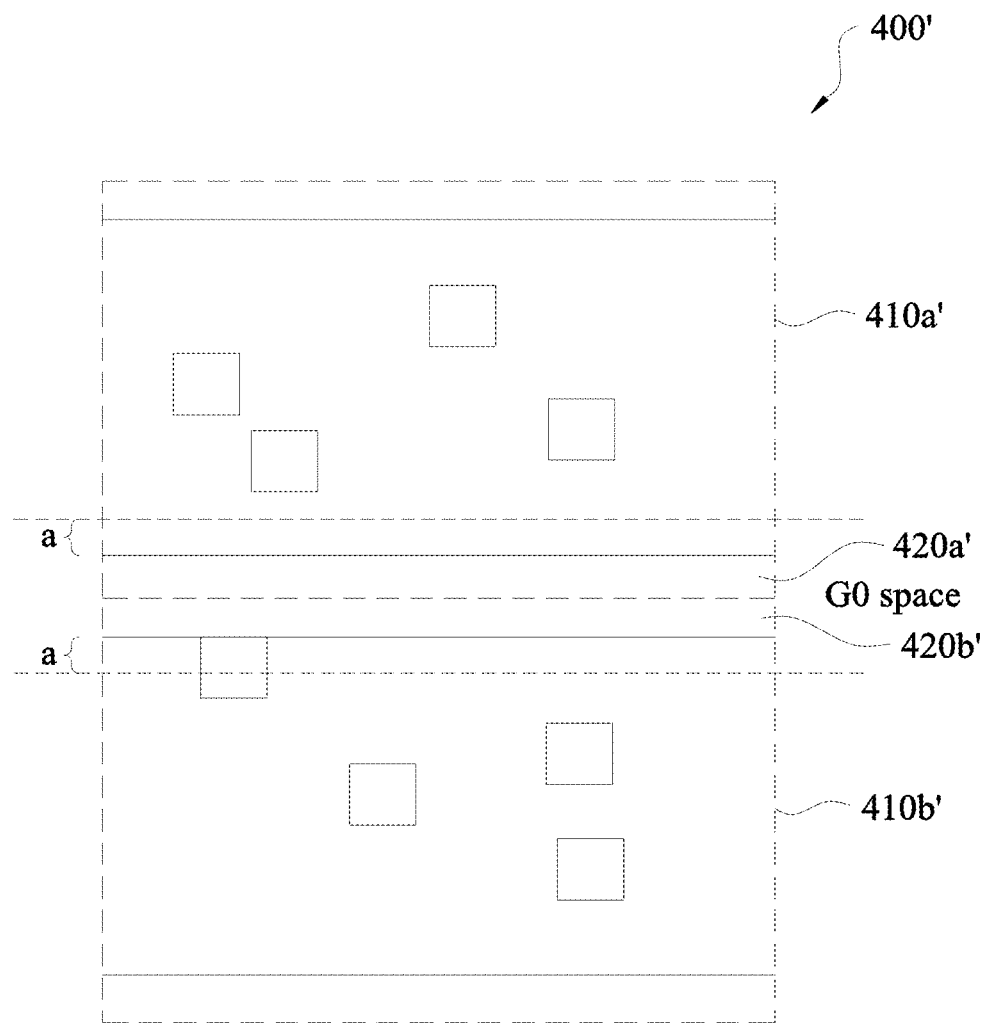
FIG. 4B is a plan view of a semiconductor device including two abutting standard cells in accordance with some embodiments.

FIG. 4B is a plan view of a semiconductor device 400' including two abutting standard cells 410*a*' and 410*b*' in accordance with some embodiments. Cell 410*a*' includes sensitivity region 420*a*' abutting sensitivity region 420*b*' of cell 410*b*'. Features of cells 410*a*' and 410*b*' do not overlap sensitivity regions 420*a*' and 420*b*'. The lack of links in semiconductor device 400' indicate that the location of features near the abutting surface of cell 410*a*' and 410*b*' do not impact whether the semiconductor device is n-colorable.

A combined width of sensitivity regions 420*a*' and 420*b*' is less than the GO spacing. Semiconductor device 400' includes a width of sensitivity region 420*a*' and 420*b*' each being the GO spacing reduced by amount a. In some embodiments, a width of sensitivity region 420*a*' is different from a width of sensitivity region 420*b*'. The combined width of sensitivity regions 420*a*' and 420*b*' is less than the GO spacing because the manufacturing process used to form semiconductor device 400' has a smaller minimum separation distance than the manufacturing process used to form semiconductor device 400.

In some embodiments, a manufacturing process for a first layer of a semiconductor device differs from a manufacturing process for a second layer of the semiconductor device. For example, in some embodiments, the manufacturing process of the first layer is similar to semiconductor device 400, where the combined width of sensitivity regions 420*a* and 420*b* is equal to the GO spacing, and the manufacturing process of the second layer is similar to semiconductor device 400', where the combined width of sensitivity regions 420*a*' and 420*b*' is less than the GO spacing.

FIG. 5 is a plan view of a standard cell 500 including anchor nodes 510 in accordance with some embodiments. Standard cell 500 has a same structure as standard cell 300 with the addition of anchor nodes 510. FIG. 5 includes an enlarged view of a portion of standard cell 500 to clarify the inclusion of anchor nodes 510 into the standard cell. Additional features of standard cell 500 are also linked to anchor nodes 510 based on risk factors; however, only anchor nodes 510 linked to features 330*f*, 330*h* and 330*i* are included in FIG. 5 for the sake of clarity.

Feature 330*f* has a risk factor of three, as discussed above. Due to the risk factor of feature 330*f*, three anchor nodes 510 are linked to feature 330*f*. Feature 330*h* has risk factor of one, so one anchor node 510 is linked to feature 330*h*. Feature 330*i* has a risk factor of two, so two anchor nodes 510 are linked to feature 330*i*. As discussed above, anchor nodes 510 are virtual nodes used for decomposition of a conflict graph of standard cell 500 to determine whether standard cell 500 is n-colorable.

Figure 6A:
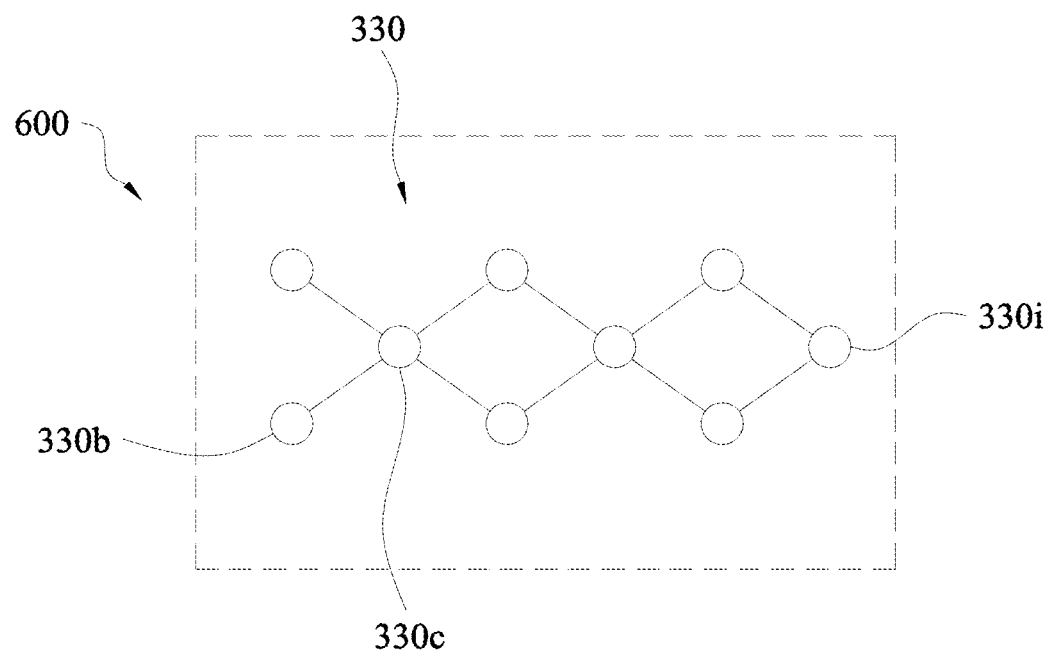
FIG. 6A is a plan view of a conflict graph of the standard cell of FIG. 3 in accordance with some embodiments.

FIG. 6A is a plan view of a conflict graph 600 of standard cell 300 (FIG. 3) in accordance with some embodiments. Conflict graph 600 includes a node corresponding to each feature 330 of standard cell 300. The nodes of conflict graph 600 are connected by links corresponding to links 340 of standard cell 300.

Figure 6B:
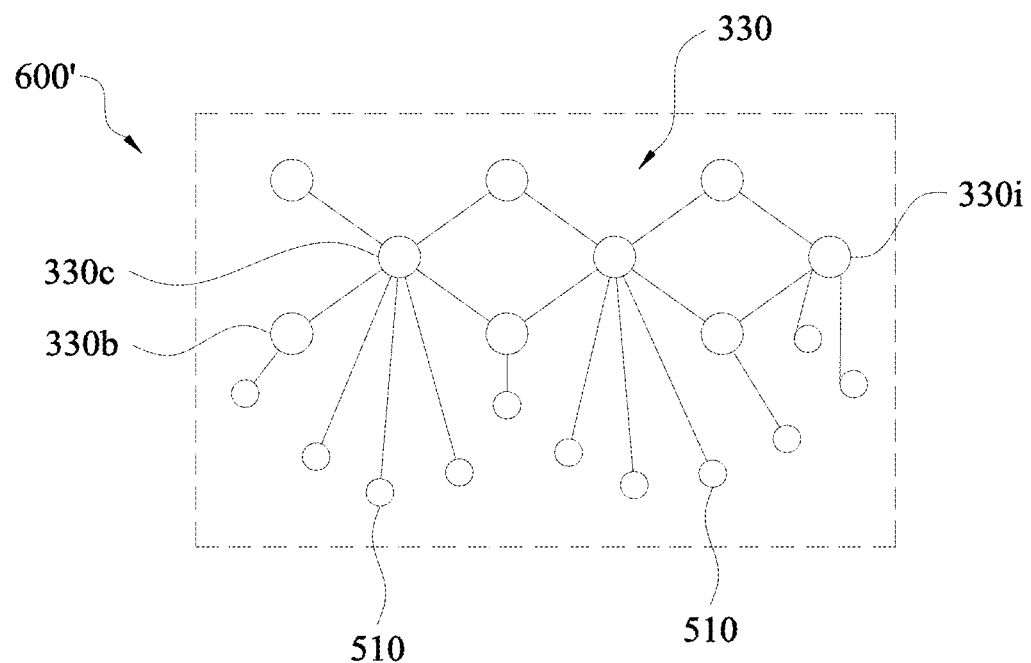
FIG. 6B is a plan view of a conflict graph of the standard cell of FIG. 5 in accordance with some embodiments.

FIG. 6B is a plan view of a conflict graph 600' of standard cell 500 (FIG. 5) in accordance with some embodiments. Conflict graph 600' includes a node corresponding to each feature 330 of standard cell 500. In addition, conflict graph 600' includes anchor nodes 510 linked to features 330 based on the risk factor associated with each feature. The nodes of conflict graph 600' are connected by links corresponding to links 340 of standard cell 500.

The inclusion of anchor nodes 510 a number of links connected to feature 330*b* increases from one in conflict graph 600 to two in conflict graph 600'. Similarly, a number of links connected to feature 330*c* increases from four in conflict graph 600 to seven in conflict graph 600'. Another example of an increase in a number of links is feature 330*i* which has an increase in a number of links from one in conflict graph 600 to three in conflict graph 600'. As a result of the increased number of links for feature 330*i*, feature 330*i* will not be removed during decomposition of conflict graph 600' for a triple patterning process, e.g., operation 240 having n equal to three (FIG. 2). However, for decomposition of conflict graph 600, feature 330*i* would be removed during decomposition for a triple patterning process.

Figure 7A:
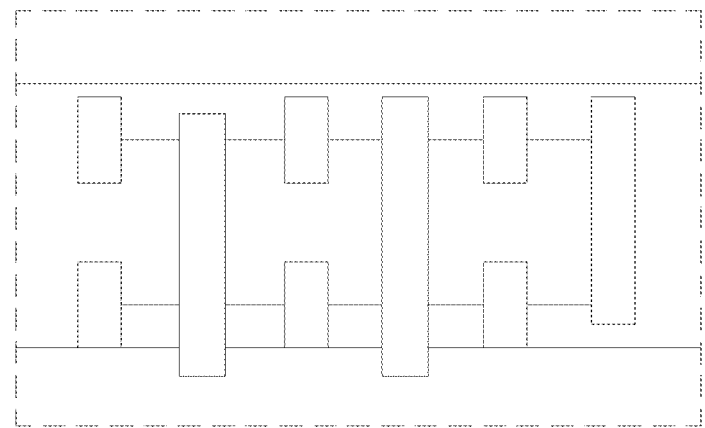
FIG. 7A is a plan view of a decomposed standard cell of FIG. 3 in accordance with some embodiments.

FIG. 7A is a plan view of a decomposed standard cell 300, in accordance with some embodiments. Decomposition of standard cell 300, which does not include anchor nodes, results in removal of all features. In the example of standard cell 300, for a triple patterning process, features 330*a*, 330*b*, 330*d*, 330*e*, 330*g*, 330*h* and 330*i* are removed in a first iteration of the decomposition process because the number of links for these features is less than three. By removing the features in the first iteration of the decomposition process, a number of links for features 330*c* and 330*f* is reduced from four to zero. Therefore, in a second iteration of the decomposition process, features 330*c* and 330*f* are removed. The result is that all features are removed and standard cell 300 is determined to be 3-colorable. However, when standard cell 300 is included in a semiconductor device, e.g., semiconductor device 400 (FIG. 4A), features 330 of standard cell 300 are at risk of being within a minimum spacing of elements in an abutting cell.

Figure 7B:
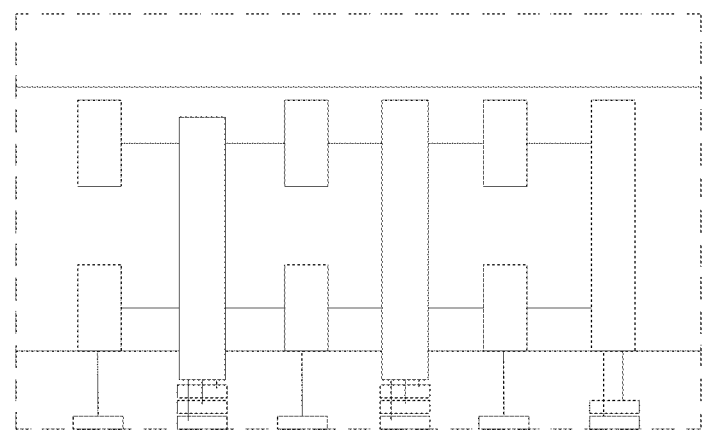
FIG. 7B is a plan view of a decomposed standard cell of FIG. 5 in accordance with some embodiments.

FIG. 7B is a plan view of a decomposed standard cell 500 in accordance with some embodiments. Decomposition of standard cell 500, which includes anchor nodes 510, results in removal of only some of the features 330 of standard cell 500. The first iteration of decomposition for a triple patterning process on standard cell 500 removes features 330*a*, 330*b*, 330*d* and 330*g* because these features have less than three links. After removal of these features from standard cell 500, all remaining features have three or more links, so no additional features are removed by subsequent iterations of decomposition.

Following decomposition of standard cell 500, remaining features, i.e., features 330*c*, 330*e*, 330*f*, 330*h* and 330*i*, are analyzed to determine whether these features are 3-colorable. The remaining features are analyzed as discussed above with respect to operation 250 (FIG. 2).

By including anchor nodes 510 in standard cell 500, standard cell 500 is usable in a semiconductor device without an extra processing step of determining whether the semiconductor device is colorable because anchor nodes account for the risk of links between features of abutting cells. As a result, a semiconductor design process which accounts for boundary conditions within individual cells has a reduced number of modifications and complexity in comparison with semiconductor design processes which fail to account for boundary conditions of individual cells.

Figure 8:
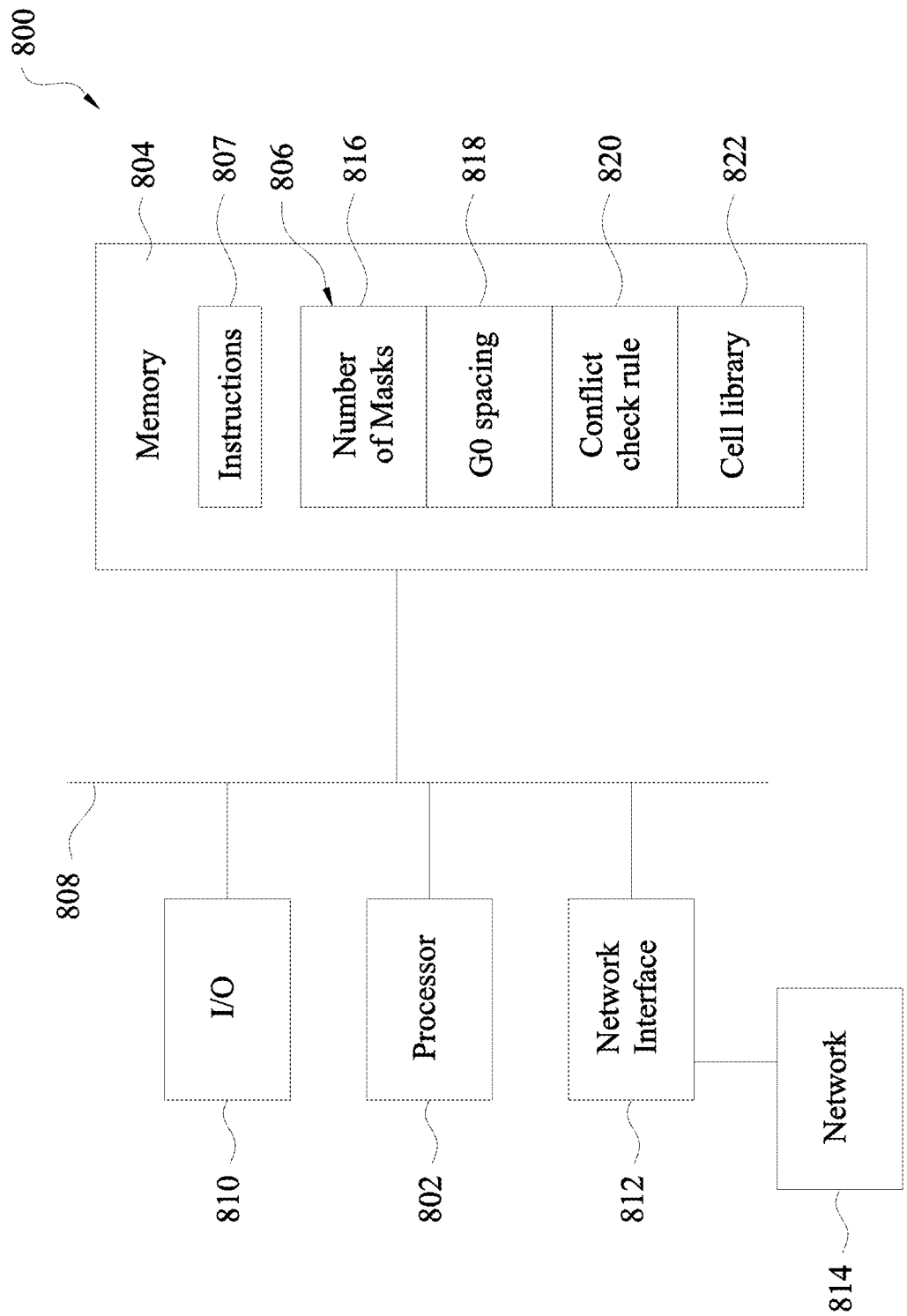
FIG. 8 is a schematic diagram of a system for designing a semiconductor device in accordance with some embodiments.

FIG. 8 is a schematic view of a system 800 for designing a semiconductor device in accordance with some embodiments. System 800 includes a hardware processor 802 and a non-transitory, computer readable storage medium 804 encoded with, i.e., storing, the computer program code 806, i.e., a set of executable instructions. Computer readable storage medium 804 is also encoded with instructions 807 for interfacing with manufacturing machines for producing the memory array. The processor 802 is electrically coupled to the computer readable storage medium 804 via a bus 808. The processor 802 is also electrically coupled to an I/O interface 810 by bus 808. A network interface 812 is also electrically connected to the processor 802 via bus 808. Network interface 812 is connected to a network 814, so that processor 802 and computer readable storage medium 804 are capable of connecting to external elements via network 814. The processor 802 is configured to execute the computer program code 806 encoded in the computer readable storage medium 804 in order to cause system 800 to be usable for performing a portion or all of the operations as described in method 100 or method 200.

In some embodiments, the processor 802 is a central processing unit (CPU), a multi-processor, a distributed processing system, an application specific integrated circuit (ASIC), and/or a suitable processing unit.

In some embodiments, the computer readable storage medium 804 is an electronic, magnetic, optical, electromagnetic, infrared, and/or a semiconductor system (or apparatus or device). For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the storage medium 804 stores the computer program code 806 configured to cause system 800 to perform method 100 or method 200. In some embodiments, the storage medium 804 also stores information needed for performing a method 100 or 200 as well as information generated during performing the method 100 or 200, such as a number of masks parameter 816, a GO spacing parameter 818, a conflict check rule parameter 820, a cell library parameter 822, and/or a set of executable instructions to perform the operation of method 100 or 200.

In some embodiments, the storage medium 804 stores instructions 807 for interfacing with manufacturing machines. The instructions 807 enable processor 802 to generate manufacturing instructions readable by the manufacturing machines to effectively implement method 100 or method 200 during a manufacturing process.

System 800 includes I/O interface 810. I/O interface 810 is coupled to external circuitry. In some embodiments, I/O interface 810 includes a keyboard, keypad, mouse, trackball, trackpad, and/or cursor direction keys for communicating information and commands to processor 802.

System 800 also includes network interface 812 coupled to the processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interface such as ETHERNET, USB, or IEEE-1394. In some embodiments, method 100 or 200 is implemented in two or more systems 800, and information such as number of masks, GO spacing, conflict check rule and cell library are exchanged between different systems 800 via network 814.

System 800 is configured to receive information related to a number of masks through I/O interface 810 or network interface 812. The information is transferred to processor 802 via bus 808 to determine a number of masks used for producing a layer of a semiconductor device. The number of masks is then stored in computer readable medium 804 as number of masks parameter 816. System 800 is configured to receive information related to GO spacing through I/O interface 810 or network interface 812. The information is stored in computer readable medium 804 as GO spacing parameter 818. System 800 is configured to receive information related to conflict rule check through I/O interface 810 or network interface 812. The information is stored in computer readable medium 804 as conflict rule check parameter 820. System 800 is configured to receive information related to a cell library through I/O interface 810 or network interface 812. The information is stored in computer readable medium 804 as cell library parameter 822.

An aspect of this description relates to a semiconductor device. The semiconductor device includes a first cell. The first cell includes a first functional feature, a first sensitivity region, at least one anchor node, wherein each of the at least one anchor node is different from the first functional feature, and a number of anchor nodes of the at least one anchor node linked to the first functional feature is based on a position of the first functional feature relative to the first sensitivity region. The semiconductor device further includes a second cell abutting the first cell. The second cell includes a second functional feature, wherein the second functional feature satisfies a minimum spacing requirement with respect to the first functional feature. In some embodiments, the number of anchor nodes is one in response to an edge of the first functional feature aligning with an edge of the first sensitivity region. In some embodiments, the number of anchor nodes is a first number, greater than one, in response to an edge of the first functional feature extending into the first sensitivity region a distance less than a threshold distance. In some embodiments, the number of anchor nodes is a second number, greater than the first number, in response to the edge of the first functional feature extending into the first sensitivity region a distance equal to or greater than the threshold distance.

An aspect of this description relates to a system. The system includes a non-transitory computer readable medium configured to store instructions thereon. The system further includes a processor connected to the non-transitory computer readable medium. The processor is configured to execute the instructions for establishing boundary conditions for a layout of a first cell, wherein the first cell comprises a single cell boundary surrounding a plurality of features, and establishing boundary conditions for the layout of the first cell is based on a proximity of each feature of the plurality of features to the single cell boundary. The processor is configured to execute the instructions for determining whether the layout of the first cell is colorable based on a number of masks used to manufacture a layer of the semiconductor device, a minimum spacing requirement for the plurality of features, and the established boundary conditions. The processor is configured to execute the instructions for abutting the first cell to a second cell. In some embodiments, the processor is further configured to execute the instructions for abutting the first cell to the second cell in response to a determination that the layout of the first cell is colorable. In some embodiments, the processor is further configured to execute the instructions for abutting the first cell to the second cell, without determining whether the second cell is colorable, in response to a determination that the layout of the first cell is colorable. In some embodiments, the processor is further configured to execute the instructions for retrieving the second cell from a cell library prior to abutting the first cell to the second cell. In some embodiments, the processor is further configured to execute the instructions for establishing the boundary conditions by determining a number of anchor nodes attached to each of the plurality of features. In some embodiments, the processor is further configured to execute the instructions for determining the number of anchor nodes by increasing the number of anchor nodes as the proximity of a corresponding feature of the plurality of features to the cell boundary decreases. In some embodiments, the processor is further configured to execute the instructions for modifying the first cell in response to a determination that the layout of the first cell is not colorable. In some embodiments, the processor is further configured to execute the instructions for instructing a manufacturing tool to manufacture a mask based on the first cell layout in response to a determination that the layout of the first cell is colorable.

An aspect of this description relates to a method. The method includes establishing boundary conditions for a layout of a first cell, wherein the first cell comprises a single cell boundary surrounding a plurality of features, and establishing boundary conditions for the layout of the first cell is based on a proximity of each feature of the plurality of features to the single cell boundary. The method further includes determining whether the layout of the first cell is colorable based on the established boundary conditions. The method further includes abutting the first cell to a second cell. The method further includes abutting the first cell to a third cell, wherein the first cell, the second cell and the third cell are part of a layout. The method further includes reporting the layout to be colorable without analyzing at least one of the second cell or the third cell. In some embodiments, determining whether the layout of the first cell is colorable includes determining whether the layout of the first cell is colorable further based on a minimum spacing requirement for the plurality of features. In some embodiments, abutting the first cell to the second cell in response to a determination that the layout of the first cell is colorable. In some embodiments, the method further includes modifying the layout of the first cell in response to a determination that the layout of the first cell is not colorable. In some embodiments, abutting the first cell to the second cell includes abutting the modified first cell to the second cell. In some embodiments, determining whether the layout of the first cell is colorable includes generating a conflict graph. In some embodiments, establishing the boundary conditions includes determining a number of anchor nodes attached to each of the plurality of features, and determining the number of anchor nodes includes increasing the number of anchor nodes as the proximity of a corresponding feature of the plurality of features to the cell boundary decreases. In some embodiments, the method further includes instructing a manufacturing tool to manufacture a mask based on the layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:
a non-transitory computer readable medium configured to store instructions thereon; and
a processor connected to the non-transitory computer readable medium, wherein the processor is configured to execute the instructions for:
establishing boundary conditions for a layout of a first cell, wherein the first cell comprises a single cell boundary surrounding a plurality of features, and establishing boundary conditions for the layout of the first cell is based on a proximity of each feature of the plurality of features to the single cell boundary;
determining whether the layout of the first cell is colorable based on a number of masks used to manufacture a layer of the semiconductor device, a minimum spacing requirement for the plurality of features, and the established boundary conditions; and
abutting the first cell to a second cell.

2. The system of claim 1, wherein the processor is further configured to execute the instructions for abutting the first cell to the second cell in response to a determination that the layout of the first cell is colorable.

3. The system of claim 1, wherein the processor is further configured to execute the instructions for abutting the first cell to the second cell, without determining whether the second cell is colorable, in response to a determination that the layout of the first cell is colorable.

4. The system of claim 1, wherein the processor is further configured to execute the instructions for retrieving the second cell from a cell library prior to abutting the first cell to the second cell.

5. The system of claim 1, wherein the processor is further configured to execute the instructions for establishing the boundary conditions by determining a number of anchor nodes attached to each of the plurality of features.

6. The system of claim 5, wherein the processor is further configured to execute the instructions for determining the number of anchor nodes by increasing the number of anchor nodes as the proximity of a corresponding feature of the plurality of features to the cell boundary decreases.

7. The system of claim 1, wherein the processor is further configured to execute the instructions for modifying the first cell in response to a determination that the layout of the first cell is not colorable.

8. The system of claim 1, wherein the processor is further configured to execute the instructions for instructing a manufacturing tool to manufacture a mask based on the first cell layout in response to a determination that the layout of the first cell is colorable.

9. A method comprising:
establishing boundary conditions for a layout of a first cell, wherein the first cell comprises a single cell boundary surrounding a plurality of features, and establishing boundary conditions for the layout of the first cell is based on a proximity of each feature of the plurality of features to the single cell boundary;
determining whether the layout of the first cell is colorable based on the established boundary conditions;
abutting the first cell to a second cell;

abutting the first cell to a third cell, wherein the first cell, the second cell and the third cell are part of a layout; and reporting the layout to be colorable without analyzing at least one of the second cell or the third cell.

10. The method of claim 9, wherein determining whether the layout of the first cell is colorable comprises determining whether the layout of the first cell is colorable further based on a minimum spacing requirement for the plurality of features.

11. The method of claim 9, wherein abutting the first cell to the second cell in response to a determination that the layout of the first cell is colorable.

12. The method of claim 9, further comprising modifying the layout of the first cell in response to a determination that the layout of the first cell is not colorable.

13. The method of claim 12, wherein abutting the first cell to the second cell comprises abutting the modified first cell to the second cell.

14. The method of claim 9, wherein determining whether the layout of the first cell is colorable comprises generating a conflict graph.

15. The method of claim 9, wherein establishing the boundary conditions comprises determining a number of anchor nodes attached to each of the plurality of features, and determining the number of anchor nodes comprises increasing the number of anchor nodes as the proximity of a corresponding feature of the plurality of features to the cell boundary decreases.

16. The method of claim 9, further comprising instructing a manufacturing tool to manufacture a mask based on the layout.

17. A method comprising:
establishing boundary conditions for a first cell, wherein the first cell comprises a cell boundary surrounding a plurality of features, establishing boundary conditions for the first cell is based on a proximity of each feature of the plurality of features to the cell boundary, and the cell boundary is defined by an interface between the first cell and a second cell;

determining whether the first cell is colorable based on the established boundary conditions;

abutting the first cell to a third cell, wherein the first cell, the second cell and the third cell are part of a layout; and reporting the layout to be colorable without analyzing at least one of the second cell or the third cell.

18. The method of claim 17, further comprising abutting the first cell to the second cell.

19. The method of claim 18, wherein abutting the first cell to the second cell after establishing the boundary conditions.

20. The method of claim 17, wherein establishing the boundary conditions comprises establishing the boundary conditions for the first cell based on a proximity of each feature of the plurality of features to a second cell boundary, and the second cell boundary defines an interface between the first cell and the third cell.

* * * * *